(12) United States Patent
Mizumoto et al.

(10) Patent No.: US 7,521,524 B2
(45) Date of Patent: Apr. 21, 2009

(54) POLYMERIZATION METHOD AND POLYMERIZATION APPARATUS

(75) Inventors: Mamoru Mizumoto, Hitachinaka (JP); Toshiaki Matsuo, Hitachi (JP); Takayuki Matsumoto, Hitachi (JP); Naruyasu Okamoto, Tokyo (JP); Ryuuji Kajiya, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 412 days.

(21) Appl. No.: 11/071,326

(22) Filed: Mar. 4, 2005

(65) Prior Publication Data
US 2005/0203271 A1    Sep. 15, 2005

(30) Foreign Application Priority Data
Mar. 4, 2004  (JP) ............................. 2004-060399

(51) Int. Cl.
C08G 63/00    (2006.01)
C08G 63/08    (2006.01)
C08G 63/78    (2006.01)

(52) U.S. Cl. .................... 528/354; 528/502 R; 528/503

(58) Field of Classification Search ................. 528/354, 528/502 R, 503
See application file for complete search history.

(56) References Cited
FOREIGN PATENT DOCUMENTS

| JP | 05-093050 | 4/1993 |
|----|-----------|--------|
| JP | 07-126308 | 5/1995 |
| JP | 10-120772 | 5/1998 |
| JP | 10-158371 | 6/1998 |
| JP | 10-218981 | 8/1998 |
| JP | 2000-143781 | 5/2000 |

OTHER PUBLICATIONS

S-H. Hyon, Kjamshidi, Y. Ikada, "Synthesis of polylactides with different molecular weights", Biomaterials, vol. 18, pp. 1503-1508 (1997).

"Polylactic acid", Polymer Publishing Committee, pp. 15, (1997).

*Primary Examiner*—Duc Truong
(74) *Attorney, Agent, or Firm*—Antonelli, Terry, Stout & Kraus, LLP.

(57) ABSTRACT

A polymerization method comprises, prior to polymerization of a monomer of the cyclic dimer of alpha-hydroxycarboxylic acid, a first mixture of a polymerization catalyst by bypassing a part of the monomer of the cyclic dimer is prepared. Then, the first mixture is mixed with a dominant amount of the monomer introduced into a polymerization reactor. The monomer of the cyclic dimer in the polymerization reactor is conducted in the presence of a polymerization initiator.

21 Claims, 5 Drawing Sheets

US 7,521,524 B2

POLYMERIZATION METHOD AND POLYMERIZATION APPARATUS

CLAIM OF PRIORITY

This application claims priority from Japanese application serial No. 2004-60399, filed on Mar. 4, 2004, the content of which is hereby incorporated by reference into this application.

1. Field of the Invention

The present invention relates to a method and apparatus for polymerization of polylactic acid with a high efficiency under such conditions that the product is not degraded.

2. Related Art

The compound shown in FIG. 2 is a cyclic dimer of alpha-hydroxycarboxylic acid, wherein molecules of the alpha-hydroxycarboxylic acid bring about esterification reaction. If a substitute group (R) is a methyl group (—CH$_3$), the dimer is lactide, which is a cyclic dimer of lactic acid. If R is hydrogen (—H), the dimer is glycolide, which is a dimer of glycollic acid. This compound ring-opens at bonding positions (—(C=O)—O—) of the ester in the presence of a catalyst such as tin 2-ethylhexanoate, etc to form ester conjunctions between molecules, thereby polymerizing to form a high molecular weight polymer. As a polymerization initiator, alcohols are widely used in general. Since a very small amount of water contained in a monomer as an impurity works as the polymerization initiator, there are cases where only the polymerization catalyst is added, while no polymerization initiator is added.

In a conventional ring-opening polymerization of the cyclic dimer of alpha-hydroxycarboxylic acid, as a method of adding the polymerization catalyst and/or polymerization initiator, the monomer, polymerization catalyst and polymerization initiator are supplied, in general, independently through a monomer supply apparatus, a polymerization catalyst supply apparatus and a polymerization initiator supply apparatus. As shown in FIG. 3, the polymerization catalyst and the polymerization initiator are directly added through the polymerization catalyst supply apparatus 52 and polymerization initiator supply apparatus 53 from the catalyst storage tank 12 and the initiator storage tank 13 to the monomer, which is supplied from a monomer storage tank 11 through the monomer supply apparatus 51. In this method, when a concentration of the polymerization catalyst and/or the polymerization initiator in the monomer is changed, the supply amounts of the catalyst and/or the initiator by the catalyst supply apparatus and/or the initiator supply apparatus are set in accordance with the predetermined amounts. This technology is disclosed in Patent Document Nos. 1 and 2.

However, there is a case where a concentration of the catalyst and/or the initiator is lowered. Further, there is a case where since activity of the catalyst is too high, the concentration must be lowered to control the polymerization reaction. There is another case where a concentration of the initiator is lowered to increase a molecular weight. In such case, the concentration of the polymerization catalyst and/or polymerization initiator may become as small as ppm order.

When the concentration of the polymerization catalyst and/or the polymerization initiator is lowered, an additive amount of the catalyst and/or initiator becomes extremely smaller than that of the monomer. Accordingly, when the catalyst and/or the initiator is directly mixed into a stream of the monomer by means of the apparatus shown in FIG. 3, a desired amount of the catalyst and/or the initiator may not be supplied. For example, when a catalyst is supplied at 0.5 g/h to a polymerization apparatus to which a monomer is supplied at 10 kg/h, the supply of the catalyst and/or the initiator becomes instable due to fluctuation of a pressure at an outlet of the catalyst supply apparatus and/or the initiator supply apparatus. As a result, a desired amount of the catalyst and/or the initiator may not be supplied. If an inner diameter of the supply conduit for the catalyst and/or the initiator is made small so as to increase the pressure loss in the supply passage, there may be occur a clog of the conduit.

Patent document No. 3 discloses a method of manufacturing metacryllic polymers, wherein a part of a monomer is bypassed, the bypassed monomer and a catalyst are mixed, and the resulting mixture is mixed with a dominant amount of the monomer. Patent document No. 4 discloses a method of manufacturing a polylactic acid polymer as same as the present invention, wherein a very small amount of a catalyst is mixed in a monomer that is kept at a temperature of a polymerization initiation.

The non-patent document No. 2 discloses a method of manufacturing poly lactic acid polymer with a combination of a polymerization catalyst and a polymerization initiator. (Patent document No. 1) Japanese Patent Laid-open No. 05-93050 (Patent document No. 2) Japanese Patent Laid-open No. 10-120772 (Patent document No. 3) Japanese Patent Laid-open No. 07-126308 (Patent document No. 4) Japanese Patent No. 3,443,265 (Non-Patent document No. 1) S-H. Hyon, K. Jamshidi, Y. Ikada, "Synthesis of polylactides with different molecular weights", Biomaterials, vol. 18, pp 1503-1508, (1997) (Non-Patent document No. 2) Polylactic acid, Polymer Publishing Committee, pp. 15 (1997)

SUMMARY OF THE INVENTION

The present invention aims at providing a polymerization method and polymerization apparatus, which do not hinder polymerization reaction of polylactic acid and can effect polymerization with a high efficiency The present invention provides a method for polymerizing a monomer of the cyclic dimer of alpha-hydroxycarboxylic acid, wherein prior to polymerization of the monomer of the cyclic dimer of alpha-hydroxycarboxylic acid, a small amount of the monomer is bypassed to mix with a polymerization catalyst thereby to prepare a first mixture, the first mixture is mixed with a dominant amount of the monomer of the cyclic dimer of alpha-hydroxycarboxylic acid, and the polymerization is started in the presence of a polymerization initiator.

The process and apparatus of the present invention suppresses polymerization reaction during the transportation and/or storage of the monomer as much as possible and aims at acceleration of the polymerization reaction with high efficiency. Accordingly, the polymerization initiator is contacted with the monomer of the cyclic dimer of alpha-hydroxycarboxylic acid in the polymerization reactor or the monomer is contacted with the polymerization catalyst just before the introduction into the polymerization reactor. From the viewpoints of reaction stability and product reliability, the monomer of the cyclic dimer of alpha-hydroxycarboxylic acid and the polymerization catalyst are contacted mainly in the polymerization reactor.

The present invention further provides a polymerization apparatus comprising a vessel for containing the monomer of the cyclic dimer of alpha-hydroxycarboxylic acid, at least one of a first conduit bypassing from the vessel, first means for adding a polymerization catalyst to the bypassed monomer of the cyclic dimer of alpha-hydroxycarboxylic acid, a polymerization reactor, a second conduit for guiding a dominant amount of the monomer of the cyclic dimer of alpha-hydroxycarboxylic acid to the polymerization reactor, a third conduit connected between the first means and the polymerization reactor, and second means for chemically contacting the monomer of the cyclic dimer of alpha-hydroxycarboxylic acid, the polymerization catalyst and the polymerization initiator in the polymerization reactor.

DETAILED DESCRIPTION OF THE PREFERRED EMBODIMENTS

Figure 1:
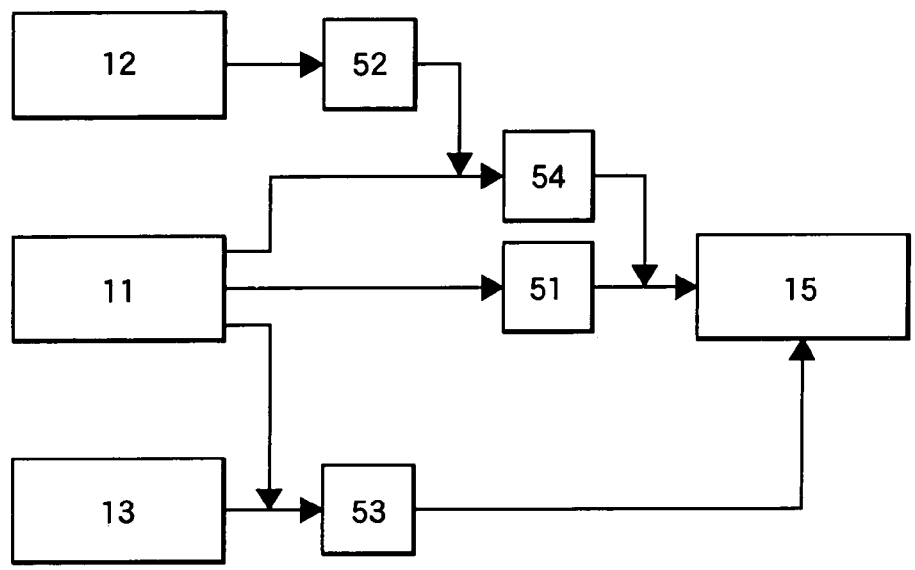
FIG. 1 is a diagrammatic view of a supply system of the present invention for a polymerization catalyst and a polymerization initiator.
Figure 2:
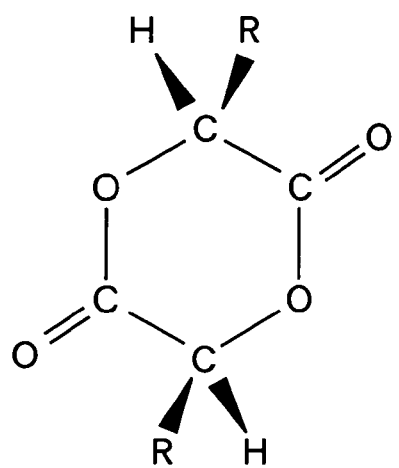
FIG. 2 shows a chemical structure of a monomer of the cyclic dimer of alpha-hydroxycarboxylic acid.
Figure 3:
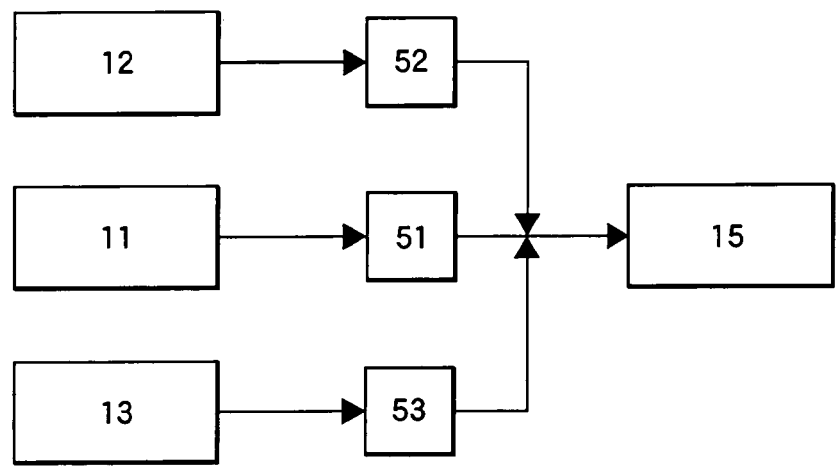
FIG. 3 is a diagrammatic view of a conventional supply system for a polymerization catalyst and a polymerization initiator.

According to the present invention, the polymerization of the monomer of the cyclic dimer of alpha-hydroxycarboxylic acid is carried out stably and effectively.

In the present invention, the monomer of the cyclic dimer of alpha-hydroxycarboxylic acid is divided into a dominant amount and a small amount with which the polymerization catalyst and/or polymerization initiator is mixed. Since the amount of the monomer of the cyclic dimer of alpha-hydroxycarboxylic acid mixed with the catalyst and/or the initiator is very much smaller than that of the dominant amount of monomer of the cyclic dimer of alpha-hydroxycarboxylic acid, the small amount of the monomer of the cyclic dimer of alpha-hydroxycarboxylic acid is bypassed so that the catalyst and/or initiator can be homogeneously mixed with the monomer of the cyclic dimer of alpha-hydroxycarboxylic acid. The resulting mixture is referred to as a first mixture.

Since an amount of the polymerization initiator is ten to 100 times the amount of the polymerization catalyst, it is not very difficult to homogeneously mix with the small amount of the monomer of the cyclic dimer of alpha-hydroxycarboxylic acid. However, the amount of the initiator is still very much small, compared with the dominant amount of the monomer of the cyclic dimer of alpha-hydroxycarboxylic acid. Further, since it is necessary that the polymerization initiator should be homogeneously mixed with the first mixture at the time of start of polymerization reaction, the polymerization initiator should be mixed with the monomer. This is called a second mixture.

The monomer of the cyclic dimer of alpha-hydroxycarboxylic acid starts polymerization in the presence of a polymerization catalyst and a polymerization initiator; as the polymerization advances, desired polylactides are produced.

Prior to introduction of the monomer of the cyclic dimer of alpha-hydroxycarboxylic acid into the polymerization reactor, the monomer is kept at a temperature lower than the polymerization initiation temperature so that undesired reaction is avoided before the reaction system becomes desired conditions. However, in order to lower an amount of impurities such as water in the monomer of the cyclic dimer of alpha-hydroxycarboxylic acid, it is preferable to keep the monomer at 80° C. or higher. In this case, the monomer of the cyclic dimer of alpha-hydroxycarboxylic acid or a mixture of the first mixture and the monomer of the cyclic dimer of alpha-hydroxycarboxylic acid should not be kept for a long time at an elevated temperature or undesired reaction may take place. Therefore, the heating time before introduction of the monomer into the polymerization reactor should preferably be 5 hours or less.

After introduction of the monomer of the cyclic dimer of alpha-hydroxycarboxylic acid and the first mixture or the monomer of the cyclic dimer of alpha-hydroxycarboxylic acid, the first mixture and the second mixture into the polymerization reactor, the reactor is heated to the polymerization initiation temperature or higher. In the case of a continuous type reactor, the reactor should be kept at a temperature higher than the polymerization initiation temperature.

Examples of the embodiments of the present invention will be explained in the following.

At first, a small amount of the monomer of the cyclic dimer of alpha-hydroxycarboxylic acid is bypassed and it is mixed with the polymerization initiator to prepare the second mixture. The second mixture is introduced into the polymerization reactor to advance polymerization of the monomer of the cyclic dimer of alpha-hydroxycarboxylic acid.

Second, after a dominant amount of the monomer of the cyclic dimer of alpha-hydroxycarboxylic acid and the first mixture are introduced into the polymerization reactor, the polymerization initiator is introduced into the polymerization reactor.

Further, the dominant amount of the monomer of the cyclic dimer of alpha-hydroxycarboxylic acid is kept at a temperature lower than the polymerization initiation temperature before it is introduced into the polymerization reactor.

A time period after the first mixture is prepared until the monomer of the cyclic dimer of alpha-hydroxycarboxylic acid is introduced into the polymerization reactor to initiate the polymerization reaction should be not larger than 5 hours.

The dominant amount of the monomer of the cyclic dimer of alpha-hydroxycarboxylic acid should be kept at a temperature higher than 80° C. before it is introduced into the polymerization reactor.

One of the examples of the polymerization apparatus according to the present invention is provided with a second conduit for adding the polymerization initiator to the bypassed monomer of the cyclic dimer of alpha-hydroxycarboxylic acid.

The polymerization apparatus may comprise means for mixing the polymerization catalyst with the bypassed monomer of the cyclic dimer of alpha-hydroxycarboxylic acid and means for mixing the polymerization initiator with the another bypassed monomer of the cyclic dimer of alpha-hydroxycarboxylic acid.

Further, the polymerization apparatus may have means for keeping the temperature of the monomer of the cyclic dimer of alpha-hydroxycarboxylic acid lower than the polymerization initiation temperature.

Still further, the polymerization apparatus may have means for keeping the monomer of the cyclic dimer of alpha-hydroxycarboxylic acid at a temperature higher than 80 C., but lower than the polymerization initiation temperature.

In an apparatus wherein the monomer of the cyclic dimer of alpha-hydroxycarboxylic acid, the polymerization catalyst and the polymerization initiator are supplied, it is essential for maintaining constant properties of the resulting polymer to stably supply predetermined amounts of the polymerization catalyst and the polymerization initiator, thereby to suppress fluctuation of the amounts of the catalyst and the initiator.

Particularly, since the ring-opening polymerization reaction of the monomer of the cyclic dimer of alpha-hydroxycarboxylic acid is exothermic reaction, there may be a problem if the concentrations of the catalyst and the initiator are not constant or not homogeneous, rates of polymerization reaction may be different in positions in the reaction system. If the reaction rate is high, there is a temperature rise, which may cause thermal degradation of the polymer product.

According to the present invention, in the continuous polymerization of the monomer of the cyclic dimer of alpha-hydroxycarboxylic acid in the presence of the polymerization catalyst and the polymerization initiator, there are provided a method and apparatus for polymerizing the monomer of the cyclic dimer of alpha-hydroxycarboxylic acid wherein the catalyst and the initiator are supplied without change of amounts of the catalyst and the initiator according to time period.

In a batch type polymerization apparatus, predetermined amounts of the monomer, the catalyst and the initiator are charged in a reactor vessel in advance. If the amounts are accurate and the reaction conditions are proper under sufficient mixing, control of the amounts may be easy. However, in an industrial production according to this system, the batch reaction must be repeated many times to produce a desired amount of polymer. Productivity of this method is low and there may be fluctuation of properties among production lots.

On the other hand, in the continuous polymerization apparatus that has a high productivity per hour, control of the concentration depends on the supply rate or supply rate. Thus, the supply rate of the low concentration catalyst and the initiator should be set to be lower than the supply rate of the monomer. If there is a large difference between the supply rates, the fluctuation may occur in the region of a low supply rate.

In general, a supply capacity of liquid supply apparatuses is proportional to a pressure loss of the supply apparatuses. Accordingly, in the cases of small supply rates of the catalyst and the initiator, the pressure loss of the supply apparatus becomes small. On the other hand, the catalyst and the initiator are mixed with the monomer, the absolute pressures at the outlets thereof become equal. If the absolute pressure at the outlet of the monomer supply apparatus may fluctuate due to the pulsation of the monomer supply apparatus. The supply amount may change in the supply apparatuses that have small supply rate and the small pressure loss. The smaller the supply rate, the larger the degree of the change becomes.

In the continuous polymerization reactor, a preferable method for avoiding the fluctuation of the supply rate is to set the pressure losses of the supply apparatuses for the monomer, the catalyst and the initiator to ranges by which the influence by the fluctuation is avoided. More specifically, the supply rates of the catalyst and the initiator should be made approximately equal. For this purpose, the catalyst and the initiator are diluted with the monomer before or at the time of their supply to the polymerization apparatus so that desired concentrations of the catalyst and the initiator are expected.

At first, the catalyst and the initiator are mixed separately with bypassed monomers, and the mixtures are supplied to the dominant amount of the monomer of the cyclic dimer of alpha-hydroxycarboxylic acid; concentrations of the catalyst and the initiator are adjusted to be desired concentrations at the time when mixtures are merged. Accordingly, the concentrations of the catalyst and the initiator in the mixtures and the rates of the mixtures to the dominant amount of the monomer of the cyclic dimer of alpha-hydroxycarboxylic acid are set.

For example, if the mixing ratio of the mixture to the dominant amount of the monomer is 1:9, the concentration of the catalyst in the mixture consisting of the monomer and the catalyst should be 10 times the predetermined concentration of the catalyst in the polymerization reactor. If the mixing ratio is set to 1:99, the concentration of the catalyst in the mixture should be 100 times the predetermined concentration.

In order to carry out a homogeneous polymerization reaction, it is preferable to eliminate a spatial concentration distribution as well as concentration distribution with time. That is, the catalyst and the initiator are thoroughly mixed with the monomer to make homogeneous concentration mixtures, which are supplied to the polymerization reactor. When the catalyst, the initiator and the monomer are mixed at first or when the catalyst and the initiator are supplied to the polymerization reactor, the conduits are provided with mixers to thoroughly mix them are used.

According to this system, since the catalyst and/or the initiator are mixed with the monomer at high concentrations, management of temperatures and the residence time of the mixtures is important. Mixing of the monomer and the catalyst and/or the initiator should be conducted at such a temperature, which is higher than the melting point of the monomer, that the polymerization reaction may be neglected.

The residence time between the mixing of the catalyst or initiator with the monomer and the introduction time of the mixtures should be made as short as possible.

In the case of lactide, for example, its melting point is 95° C.; the conduit temperature should be kept at a temperature higher than 95° C. so that the monomer is mixed in the state of liquid. When the mixture of the monomer, the initiator and the catalyst is heated, polymerization reaction initiates at around 140° C.

Figure 7:
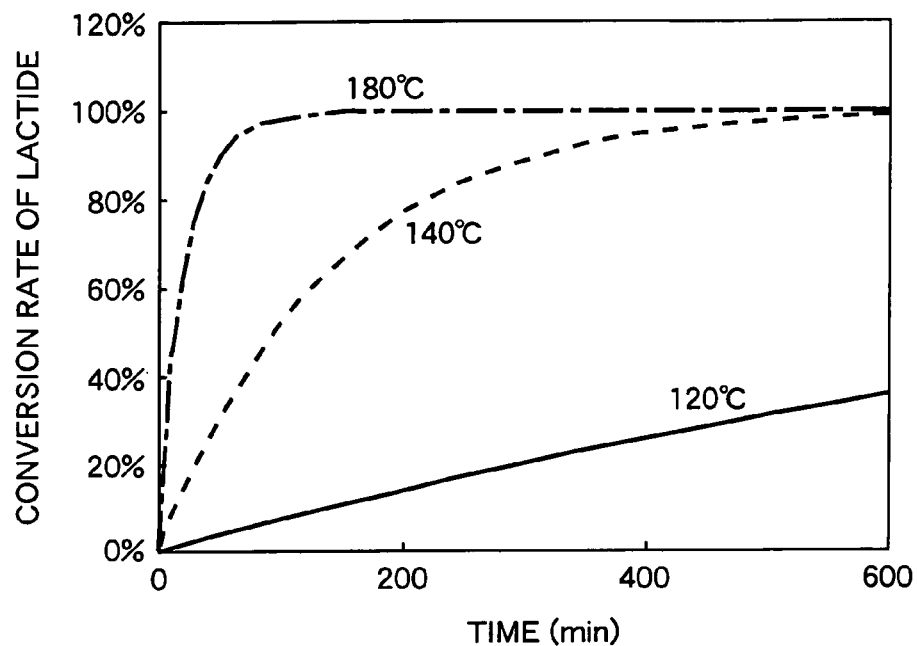
FIG. 7 is a graph showing influence of temperatures on conversion rate of lactide.

FIG. 7 shows an influence of reaction temperatures on a conversion rate of lactide with time in the ring-opening polymerization. According to this data, at the reaction temperature of 120° C. for 300 minutes (5 hours), the conversion rate of lactide was 20%; at 140° C. for 300 minutes, the conversion rate was 90%; at 170° C. for 120 minutes, the conversion rate was 99%.

Since the melting point of lactide is 95° C., the temperature of the mixture consisting of the monomer and the catalyst should be kept at 115° C., which is 20° C. lower than the melting point of lactide and the residence time is set to be 5 hours or less, the conversion rate of lactide can be suppressed to 20% or less. According to this condition, clogging of the conduits for supplying the mixtures to the polymerization reactor or in a mixing device can be prevented, the clogging being caused by progress of the polymerization reaction during the supply or mixing.

In cases where glycolide (cyclic dimer of glycollic acid) or cyclic dimers of other alpha-hydroxycarboxylic acid are used, the temperature of the mixture consisting of the monomer and the catalyst should be kept at a temperature, which is less than 20° C. higher than the melting point of the monomer.

If the residence time between the mixing of the monomer and the catalyst and introduction into the polymerization reactor is set to 5 hours or less, clogging of the conduits for supplying the mixtures or of a mixing device, which may be caused by increase in viscosity of the mixture with a progress of polymerization reaction can be avoided.

A temperature of a mixture consisting of the monomer and the polymerization initiator should be kept at a temperature, which is less than 20° C. higher than the melting point of the monomer. The residence time from the mixing to the introduction should be set to 5 hours or less, preferably within 2 hours, more preferably within one hour, thereby to suppress polymerization reaction. The clogging of the conduits for supplying the mixtures or of a mixing device, which may be caused by increase in viscosity of the mixture with a progress of polymerization reaction, can be avoided.

Polymerization of lactide will be explained by reference to FIG. 1. Since the melting point of L-lactide is 95° C., a temperature of a monomer storage tank 11 was kept at 120° C. The melted lactide was supplied by a supply apparatus 51 at a rate of 9.8 kg/h to a polymerization reactor. Tin 2-ethylhexanoate, which is a catalyst for ring-opening polymerization, was added at a supply rate of 0.5 g/h to lactide withdrawn from the monomer storage tank 11 at a withdrawing rate of 0.1 kg/h, and then the mixture was supplied to a tube-type polymerization reactor 15.

Dodecanol, which is a polymerization initiator, was added at a rate of 10 g/h from a polymerization initiator supply apparatus 53 to a small amount of the monomer withdrawn at a rate of 0.1 kg/h from the monomer storage tank 11. The concentration of the polymerization initiator was controlled to 10% by weight, and the mixture was supplied to the reactor 15. The polymerization initiator should preferably be added later than the catalyst is added.

According to the above-mentioned procedure, the mixture consisting of the tin 2-ethylhexanoate and the monomer was diluted to $1/100$ of the concentration in the tube-type polymerization reactor 15.

The mixture consisting of 1-dodecanol and the monomer was also diluted to $1/100$ of the concentration. At the time of introduction into the reactor, a concentration of tin 2-ethylhexanoate was about 50 ppm with respect to the monomer, and a concentration of 1-dodecanol was about 1000 ppm with respect to the monomer. In this case, the mixture containing the catalyst and the mixture containing the initiator were supplied at $1/98$ an amount of the monomer. Accordingly, even if there were change of flow rates due to pulsating current of the monomer, an influence on the supply amounts of the catalyst and the initiator can be minimized.

Figure 8:
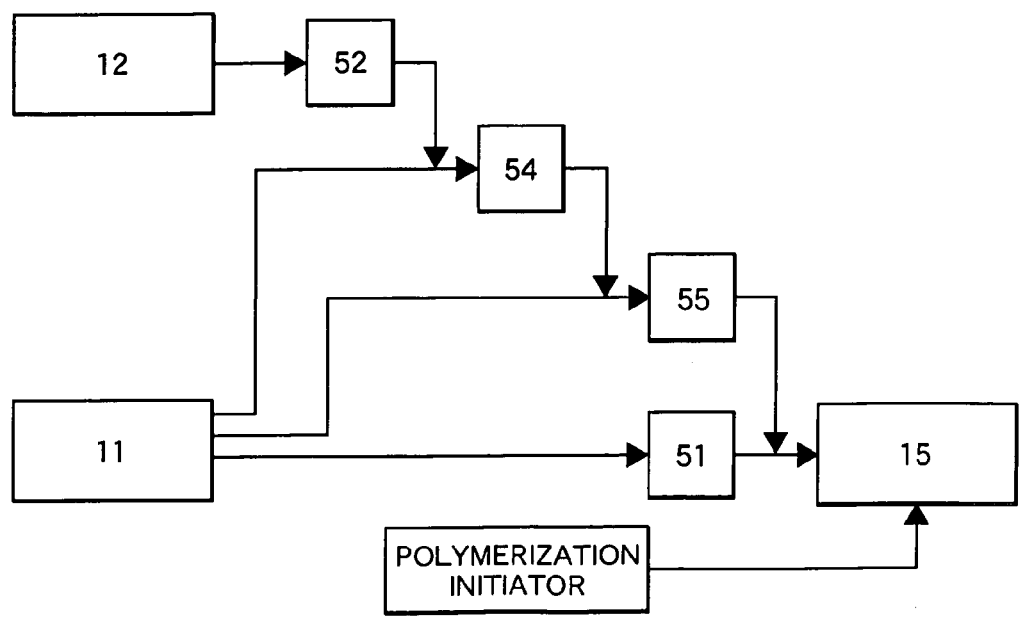
FIG. 8 is diagrammatic figure of a supply system of the present invention for the polymerization catalyst and the polymerization initiator.

Optionally, another dilution loop can be added. For example, as shown in FIG. 8, the monomer was withdrawn from the lactide storage tank 11 at 0.1 kg/h; the catalyst was added at a rate of 0.5 g/h from the catalyst supply apparatus 52 to the withdrawn monomer; the resulting concentration of the catalyst was 5000 ppm.

The resulting mixture was added to lactide withdrawn from the lactide storage container 11 at a rate of 0.9 kg/h. The concentration of the catalyst was diluted to be $1/10$, which is a predetermined concentration of 50 ppm when the mixture is added to lactide from the lactide storage apparatus. Although the explanation was made with respect to only the catalyst, handling of the initiator may be conducted in accordance with the method shown in FIG. 1.

In the ring-opening polymerization reaction of the monomer of alpha-hydroxycarboxylic acid, the spatial or local and time distribution with time of the polymerization catalyst and/or the polymerization initiator is suppressed so that the speed of the ring-opening polymerization reaction can be made constant. Accordingly, the local temperature rise is suppressed, coloring of the product is little, and a product with a constant distribution of molecular weight is obtained.

A temperature of a system for mixing the catalyst and/or the initiator with a small part of the monomer in a apparatus having supply systems for supplying the monomer to a polymerization reactor is controlled to a temperature higher than the melting point of the monomer but not higher than 20° C. of the melting point.

EXAMPLE 1

Figure 4:
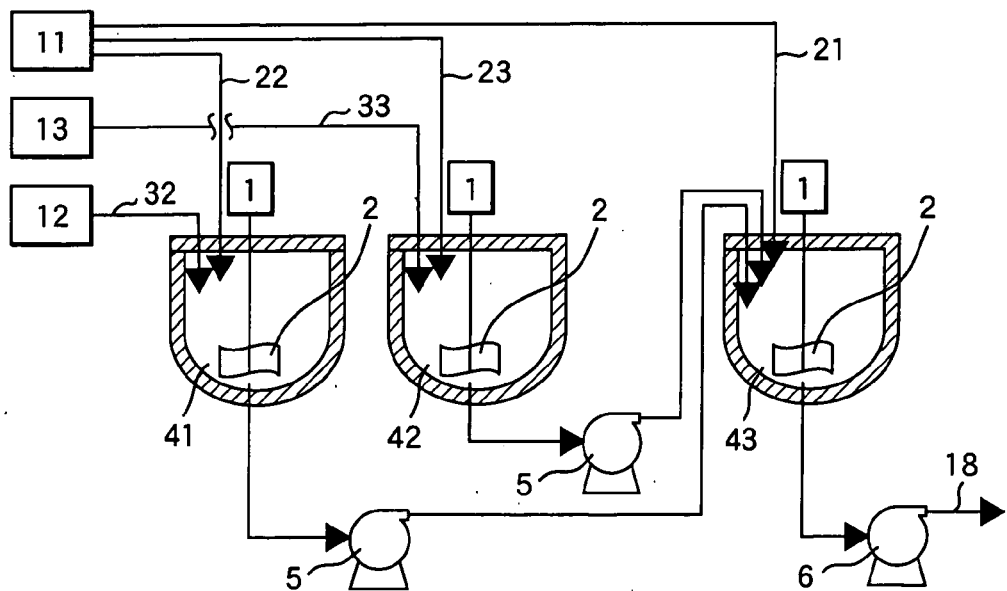
FIG. 4 is a diagrammatic view of a tank-type continuous polymerization reactor according to the first embodiment.

A ring-opening polymerization of lactide using a tank type polymerization reactor is explained by reference to FIG. 4. Tin 2-ethylhexanoate was used as a polymerization catalyst and 1-dodecanol was used as a polymerization initiator.

The lactide storage tank 11 kept at 110° C. is provided with three conduits connected to the tank-type reactor 43 having a propeller type stirring blades 2. The second supply loop 22 born 5% of the total lactide supply amount, which leads to a catalyst mixing tank 41. A predetermined amount of the catalyst is fed through the catalyst supply loop 32 from the catalyst storage tank. The catalyst and lactide were mixed with the stirring blades 2 in the catalyst mixing device stirrer of the catalyst mixing tank 41 is equivalent to the residence time of one hour. The temperature of the tank was set to 110° C.

The third lactide supply loop 23 born 10% of the total supply amount, which leads to a polymerization initiator mixing tank 42. A predetermined amount of the initiator was supplied from the polymerization initiator storage tank through the polymerization initiator supply loop 33 to the polymerization initiator mixing tank 41. The initiator and lactide are mixed in the polymerization mixing tank 41. The capacity of the polymerization mixing device was equivalent to the residence time for one hour in the tank. The tank was kept at 110° C.

The first lactide supply loop 21 born 85% of the total capacity from the lactide storage tank 11. The temperature of the conduit is kept at 140° C. The first mixture consisting of lactide and the catalyst supplied through a pump 5 from the catalyst mixing tank 41 and the second mixture consisting of lactide and the initiator supplied though a pump 5 from the initiator mixing tank 42 merged with lactide from the first supply conduit 21 to enter the polymerization reactor 43. In this case, the second mixture containing the initiator was mixed with other portion of lactide after the first mixture was mixed with a dominant amount of lactide or immediately before the mixing of the first mixture and the dominant amount of lactide. The second mixture was not mixed with the other portion of lactide before the polymerization catalyst was mixed with the dominant amount of lactide.

According to this method, the catalyst is diluted to $1/20$ of the predetermined concentration adjusted in the catalyst mixing tank the initiator was diluted to $1/10$ of the predetermined concentration adjusted in the initiator mixing tank 42.

The monomer, the catalyst and the initiator were mixed with the stirring blades 2 in the tube-type polymerization reactor 43. The resulting mixture is kept at a range of from 120 to 200° C. to advance the polymerization reaction. An average residence time in the polymerization reactor is 10 hours. The resulting polymer is discharged by means of a discharge pump 6 from a discharge port 18 provided at the bottom of the polymerization reactor.

According to this embodiment, since the first dilution of the catalyst and the initiator was conducted in the catalyst mixing tank and the initiator mixing tank and since the diluted catalyst mixture and the diluted initiator mixture are supplied to lactide in the polymerization reactor, fluctuation with time of concentrations of the catalyst and the initiator could be prevented.

Embodiment 2

Figure 5:
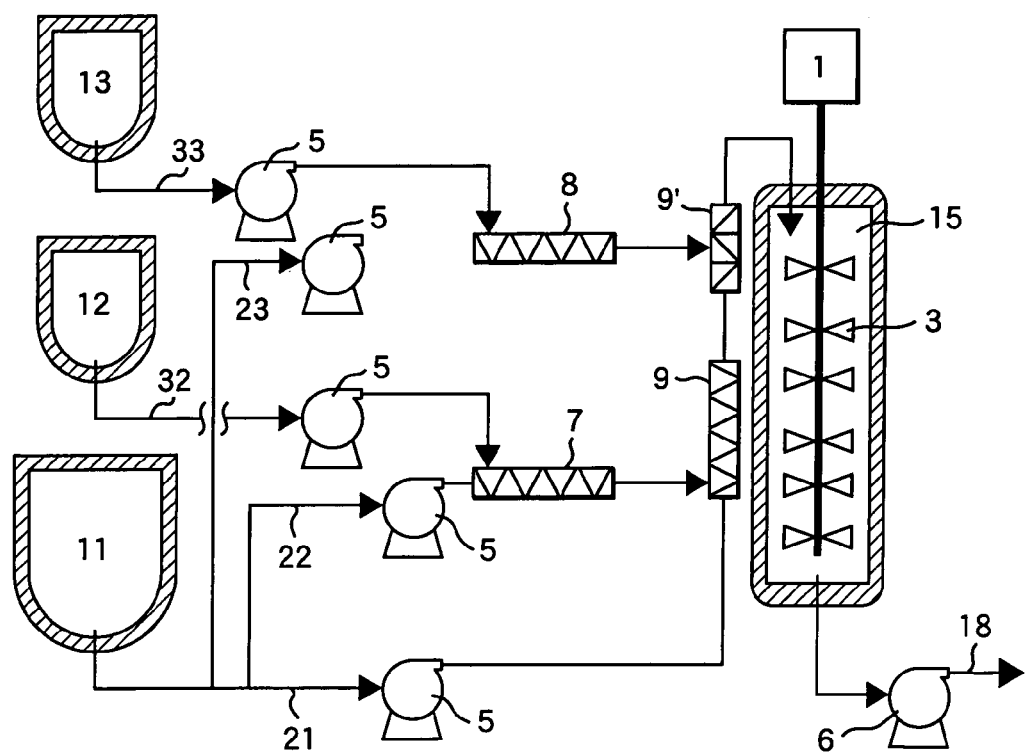
FIG. 5 is a diagrammatic view of a tube-type continuous polymerization reactor according to the second embodiment.

A ring-opening polymerization of lactide using a tube-type reactor is explained by reference to FIG. 5. Tin 2-ethylhexanoate and 1-dodecanol were used as the polymerization catalyst and the polymerization initiator, respectively.

A vertical tube-type type polymerization reactor 15 was provided with three conduits connected to the lactide storage tank 11 kept at 110° C. The polymerization reactor 15 is provided with a screw-type single axial stirring blades 3. The second monomer supply conduit 22 born 2% of the total supply amount.

The pump 5 supplied a predetermined amount of the catalyst from the catalyst storage tank 12 to the conduit. The catalyst and lactide are mixed with a screw-type single axial stirrer 7 disposed to the conduit. The temperature of the conduit is kept at 110° C. The residence time of the mixture of the catalyst and lactide between the catalyst mixing device 7 and the screw-type stirrer 9 was set to 30 minutes.

The third monomer supply conduit 23 born 5% of the total supply amount of lactide. A predetermined amount of the initiator was supplied from the initiator storage tank 13 to the conduit 23 to mix the initiator with lactide by means of an initiator mixing device 8 disposed in the conduit. The temperature of the conduit is kept at 110° C. The residence time between the initiator mixing device 8 and the mixing device 9 was set to 12 minutes.

The first monomer supply conduit 21 from the lactide storage tank 11 born 93% of the total supply amount of lactide. The temperature of the conduit was kept at 140° C. The conduit from the mixing device of the catalyst and lactide and the conduit from the mixing device of the initiator and lactide merge at the mixing device 9' to supply them to the polymerization reactor 15. The residence time of the mixture in the mixing device 9' is set to 20 minutes.

As a result, the concentration of the catalyst was diluted to 1/50 of the concentration set in the catalyst mixing device 7, and the concentration of the initiator was diluted to 1/20 of the concentration set in the initiator mixing device 8. By changing the flow rates of lactide in the three conduits, the dilution ratios of the catalyst and the initiator can be changed.

According to this method, the concentration of the catalyst was diluted to 1/50 of the concentration set in the catalyst mixing device 7, and the concentration of the initiator was diluted to 1/20 of the concentration set in the initiator mixing device 8. By changing the flow rates, the dilution ratios of the catalyst and the initiator could be changed.

The monomer, catalyst and the initiator were mixed by means of the single axial type stirring blades 3 of the tube-type polymerization reactor 15. The temperature of the reactor was kept at a range of from 140 to 200° C. to advance polymerization. The residence time in the reactor was 8 hours. The polymer product was discharged from a discharge port 18 by means of a discharge pump 6.

According to this embodiment, since the concentration of the catalyst was diluted in the catalyst mixing device and the initiator was diluted in the initiator mixing device so that diluted catalyst and initiator were supplied to the polymerization reactor, it is possible to suppress change of concentrations with time.

Embodiment 3

Figure 6:
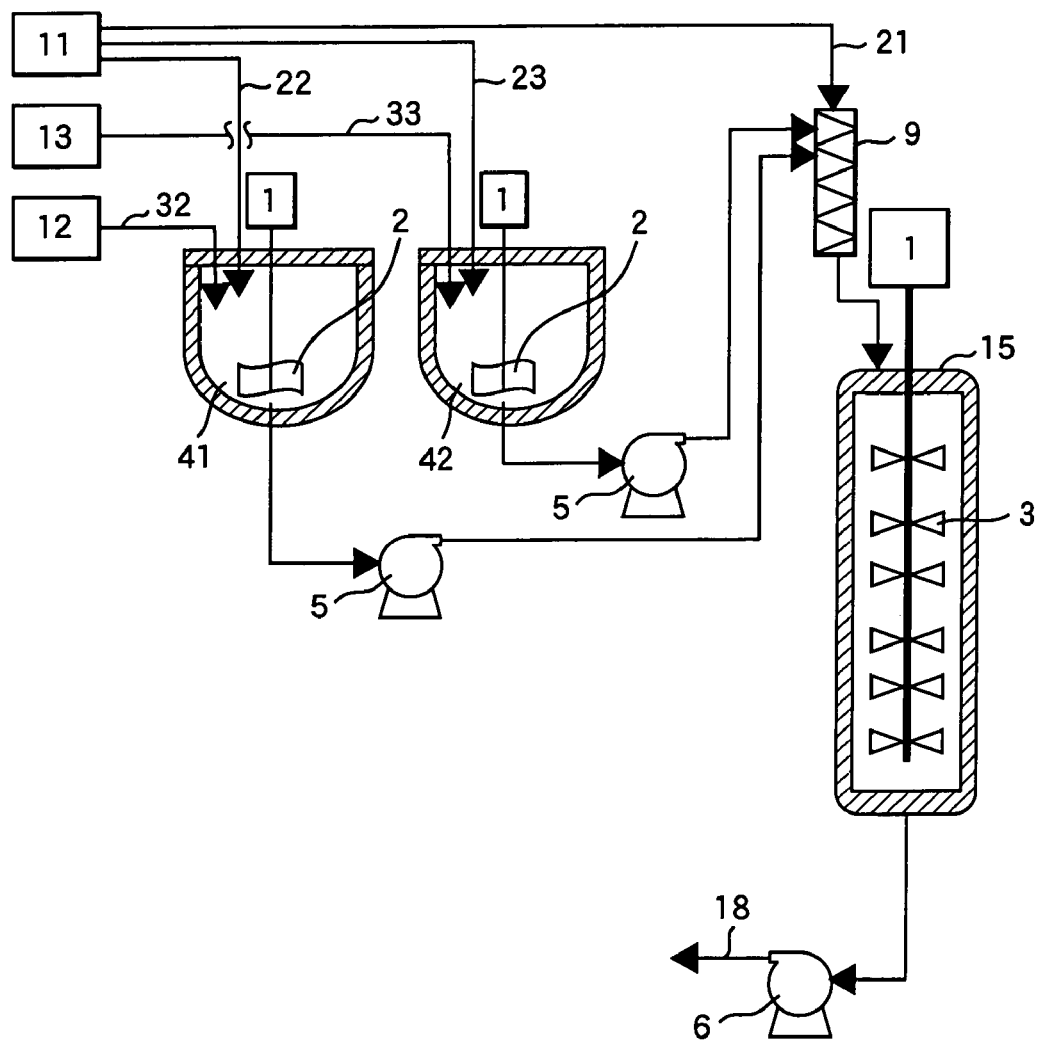
FIG. 6 is a diagrammatic view of a tube-type continuous polymerization reactor according to the third embodiment.

A polymerization method using a tube-type polymerization reactor is explained by reference to FIG. 6. Tin 2-ethylhexanoate and 1-dodecanol were used as a catalyst and an initiator for polymerization of lactide respectively.

A vertical tube-type type polymerization reactor 15 was provided with three conduits connected to the lactide storage tank 11 kept at 110° C. The polymerization reactor 15 is provided with screw-type single axial stirring blades 3. The second monomer supply conduit 22 born 5% of the total supply amount. A supply amount corresponding to that of two hours was intermittently supplied to the catalyst mixing tank 41.

Similarly, a catalyst of an amount corresponding to two hours was intermittently supplied from the catalyst storage tank 12 to the catalyst mixing tank 41 through the conduit 32. The lactide and the catalyst were mixed in the mixing tank 41 of the stirring blades 2.

A predetermined amount of the catalyst was continuously supplied from the catalyst mixing device tank through the pump 5 to the polymerization reactor 15. Another catalyst mixing tank 41 was installed, and when the other catalyst mixing device supplies the catalyst and lactide, mixing of the catalyst and lactide was continued. If the mixture in the catalyst mixing device is discharged, supply of the mixture started. The temperature of the tank was kept at 110° C.

The third monomer supply conduit 23 born 10% of the total supply amount of lactide. An amount of lactide corresponding to that for two hours was intermittently supplied into the polymerization mixing tank 42. In the mixing tank 42, the initiator and lactide were mixed by the stirring blades 2. A predetermined amount of the initiator was continuously supplied by the pump 5 to the polymerization reactor from the initiator mixing tank 42. Another initiator mixing tank 42 was installed; while the other tank was supplying the mixture of the initiator and lactide, mixing of the initiator, which was intermittently supplied and lactide was continued. When the mixture in the another mixing tank is consumed, the mixture in the other mixing tank was supplied. The temperature of the conduit was kept at 110° C.

The first monomer supply conduit 21 born 85% of the total supply amount of lactide. The mixture of lactide and the catalyst supplied from the catalyst mixing tank 41 through the pump 5 and the mixture consisting of lactide and the initiator supplied from the initiator mixing tank 42 through the pump 5 merged to enter the polymerization reactor 15 through the screw-type mixing device. The temperatures of the conduit 21 and the mixing device 9 were kept at 110° C. The residence time of the mixture between the mixing device 9' and the entrance of the polymerization reactor 15 was set to be 10 minutes.

According to this method, the concentration of the catalyst was diluted to 1/20 of the predetermined concentration in the catalyst mixing tank 41, and the concentration of the initiator was diluted to 1/10 of the predetermined concentration in the initiator mixing tank 42. By changing the flow rates if the three conduits, the dilution ratios of the catalyst and the initiator can be changed.

The catalyst and the initiator are mixed with the monomer by the single axial-type stirrer in the tube-type polymerization reactor 15. The temperature of the reactor is kept at 120 to 190° C. to advance the polymerization. The residence time in the reactor was 8 hours. The polymer product was discharged by means of the discharge pump 6 from the discharge port 18 disposed at the bottom of the reactor.

According to this embodiment, the initiator and the catalyst were diluted in the mixing devices for the first stage; since the diluted second mixture of the initiator and lactide and the diluted first mixture could be supplied to the polymerization reactor, it is possible to suppress the change of concentration with time.

In the ring-opening polymerization of the monomer of the cyclic dimer of alpha-hydroxycarboxylic acid, there are disposed a plurality of supply systems to the polymerization reactor, and the catalyst and initiator are continuously supplied to the polymerization reactor after the lactide and the initiator are supplied to the polymerization reactor. The temperature of the mixing systems for the catalyst and lactide and the initiator are kept at a temperature not higher than 20° C. of the melting point of the monomer. As a result, the reaction rate of the ring-opening polymerization can be made constant so that the characteristics of the product polymer are made constant.

What is claimed is:

1. A polymerization method comprising:
   prior to polymerization of a monomer of the cyclic dimer of alpha-hydroxycarboxylic acid,
   preparing a first mixture of a polymerization catalyst by bypassing a part of the monomer of the cyclic dimer of the alpha-hydroxycarboxylic acid,
   mixing the first mixture with a dominant amount of the monomer of the cyclic dimer of the alpha-hydroxycarboxylic acid introduced into a polymerization reactor, and
   polymerizing the monomer of the cyclic dimer of alpha-hydroxycarboxylic acid in the polymerization reactor in the presence of a polymerization initiator.

2. The polymerization method according to claim 1, wherein a part of the monomer of the cyclic dimer of the alpha-hydroxycarboxylic acid is further bypassed to prepare a second mixture of the monomer of the cyclic dimer of the alpha-hydroxycarboxylic acid and the polymerization initiator, and wherein the mixture is introduced into the polymerization reactor to effect the polymerization of the monomer of the cyclic dimer in the polymerization reactor.

3. The polymerization method according to claim 2, wherein the second mixture is introduced into the polymerization reactor after the first mixture is introduced into in the polymerization reactor.

4. The polymerization method according to claim 1, wherein the dominant amount of the monomer of the cyclic dimer of alpha-hydroxycarboxylic acid is kept at a temperature lower than a polymerization initiation temperature before it is introduced into the polymerization reactor.

5. The polymerization method according to claim 1, wherein a time period between the preparation of the first mixture and the polymerization initiation where the dominant amount of the monomer of the cyclic dimer of alpha-hydroxycarboxylic acid is introduced into the polymerization reactor is less than 5 hours.

6. The polymerization method according to claim 1, wherein the dominant amount of the monomer of the cyclic dimer of alpha-hydroxycarboxylic acid is kept at a temperature higher than 80° C. before it is introduced into the polymerization reactor.

7. The polymerization method according to claim 1, wherein the first mixture is kept at a temperature lower than a polymerization temperature before it is introduced into the polymerization reactor.

8. The polymerization method according to claim 7, wherein the first mixture is kept at a temperature higher than 80° C. before it is introduced into the polymerization reactor.

9. The polymerization method according to claim 2, wherein the first mixture is kept at a temperature lower than a polymerization temperature before it is introduced into the polymerization reactor.

10. The polymerization method according to claim 9, wherein the first mixture is kept at a temperature higher than 80° C. before it is introduced into the polymerization reactor.

11. The polymerization method according to claim 4, wherein the first mixture is kept at a temperature lower than a polymerization temperature before it is introduced into the polymerization reactor.

12. The polymerization method according to claim 11, wherein the first mixture is kept at a temperature higher than 80° C. before it is introduced into the polymerization reactor.

13. The polymerization method according to claim 5, wherein the first mixture is kept at a temperature lower than a polymerization temperature before it is introduced into the polymerization reactor.

14. The polymerization method according to claim 13, wherein the first mixture is kept at a temperature higher than 80° C. before it is introduced into the polymerization reactor.

15. The polymerization method according to claim 6, wherein the first mixture is kept at a temperature lower than a polymerization temperature before it is introduced into the polymerization reactor.

16. The polymerization method according to claim 15, wherein the first mixture is kept at a temperature higher than 80° C. before it is introduced into the polymerization reactor.

17. The polymerization method according to claim 1, wherein the first mixture does not contain the polymerization initiator.

18. The polymerization method according to claim 2, wherein the first mixture does not contain the polymerization initiator, and the second mixture does not contain the polymerization catalyst.

19. The polymerization method according to claim 4, wherein the first mixture does not contain the polymerization initiator.

20. The polymerization method according to claim 5, wherein the first mixture does not contain the polymerization initiator.

21. The polymerization method according to claim 6, wherein the first mixture does not contain the polymerization initiator.

* * * * *